United States Patent [19]
Nichols

[11] Patent Number: 5,213,226
[45] Date of Patent: May 25, 1993

[54] CONTAINER ASSEMBLY FOR FOOD

[75] Inventor: Khipra Nichols, Rumford, R.I.

[73] Assignee: Playskool Baby, Inc., Pawtucket, R.I.

[21] Appl. No.: 753,397

[22] Filed: Aug. 30, 1991

[51] Int. Cl.$^5$ ............................................. B65D 43/26
[52] U.S. Cl. ................................... 220/263; 220/337; 220/771
[58] Field of Search ............... 220/4.22, 263, 264, 220/334, 335, 337, 338, 342, 343, 771

[56] References Cited

U.S. PATENT DOCUMENTS

| | | | |
|---|---|---|---|
| 31,767 | 3/1861 | Ransom et al. | 220/334 |
| 360,335 | 3/1887 | Wood | 220/334 X |
| 425,352 | 4/1890 | Streeter | 220/335 X |
| 1,080,861 | 12/1913 | St. John | 220/263 X |
| 2,765,094 | 10/1956 | Ryan | 220/338 |
| 3,023,922 | 3/1962 | Arrington et al. | |
| 3,130,856 | 4/1964 | Gits | |
| 4,927,047 | 5/1990 | Stuber et al. | |

Primary Examiner—Stephen P. Garbe
Assistant Examiner—Nova Stucker
Attorney, Agent, or Firm—Salter, Michaelson & Benson

[57] ABSTRACT

A container assembly for foods includes a container portion, a cover portion hingeably attached to the container portion along a hinge axis, a handle portion on the container portion, and a pivot tab on the cover portion. The handle portion extends outwardly from the container portion adjacent the hinge axis and it includes an outwardly extending first portion having an opening therein and a second portion which extends downwardly from the first portion. The pivot tab is attached to the cover portion so that it is operable by a user for pivoting the cover portion to an open position, and so that the pivot tab passes downwardly through the opening in the first portion of the handle portion as the cover portion is pivoted to an open position.

6 Claims, 2 Drawing Sheets

CONTAINER ASSEMBLY FOR FOOD

BACKGROUND AND SUMMARY OF THE INVENTION

The instant invention relates to food containers and more particularly to a container assembly for food of the general type comprising hingeably connected container and cover portions.

A variety of different types of container assemblies have been heretofore available for storing, cooking, and serving foods. For example, various container assemblies which have included container portions and cover portions have been heretofore available for cooking foods in microwave ovens as well as for serving and storing foods. Most of these container assemblies have been constructed from suitable well-known plastic materials which are adapted for use in microwave ovens. However, most of the heretofore available container assemblies have not included hingeably attached cover portions, or convenient and easily operable hinge assemblies for pivoting the cover portions thereof to open positions.

Container assemblies representing the closest prior art to the subject invention of which the applicant is aware are disclosed in the U.S. Patents to ARRINGTON et al, #3,023,922; GITS, #3,130,856; and STUBER et al, #4,927,047. However, these references fail to disclose a container assembly comprising container and cover portions, wherein the container assembly can be held in one hand while the cover portion is easily pivoted to an open position with a thumb on the same hand. As a result, these references are believed to be of only general interest with respect to the container assembly of the instant invention.

The instant invention provides an effective container assembly comprising a container portion and a hingeably attached cover portion, wherein the container assembly can be effectively held in one hand while the cover portion is pivoted to an open position with a thumb on the same hand. Hence, the container assembly of the instant invention can be effectively held in one hand and maintained in an open position while food is served from the container portion with a utensil head in the user's other hand.

Specifically, the container assembly of the instant invention comprises a container portion including a bottom wall and an upstanding sidewall, a cover portion hingeably attached to the container portion along a hinge axis located adjacent the upper edge of the container portion, a handle element extending outwardly from the sidewall of the container portion adjacent the hinge axis and a pivot tab on the cover portion. The handle element has an opening formed therein adjacent the hinge axis, and the pivot tab extends outwardly from the cover portion adjacent the handle element. Further, the pivot tab is oriented so that it passes downwardly through the opening in the handle element when the cover portion is pivoted to an open position. The pivot tab is disposed at an angle of between approximately 90° and 180° relative to the bottom wall when the cover portion is in the closed position thereof, and it extends at least slightly angularly upwardly and rearwardly when the cover portion is in the closed position thereof and the container assembly is in an upright disposition. The handle element includes a first portion which extends outwardly from the sidewall of the container portion in substantially parallel relation to the bottom wall thereof, and a second portion which extends downwardly from the first portion in outwardly spaced relation to the sidewall of the container portion. The opening in the handle portion is located in the first portion thereof, and it preferably extends outwardly substantially from the hinge axis. Further, the container assembly includes a hinge shaft which extends along the hinge axis, and the pivot tab extends integrally outwardly from the hinge shaft. Still further, the hinge shaft is releasably received in a pair of pivot mounts on the handle portion, so that it extends along the hinge axis, and so that the pivot tab passes downwardly through the opening in the handle portion as the cover portion is pivoted to an open position.

It has been found that the container assembly of the instant invention can be conveniently and easily utilized for storing, preparing and serving various foods. Specifically, it has been found that because the container assembly includes a cover portion which is receivable in covering relation on the container portion, the container assembly can be effectively utilized for storing foods as well as for cooking foods in a microwave oven. Further, because of the manner in which the cover portion is hingeably attached to the container portion, the container assembly can be effectively held in one hand while the cover portion is pivoted to an open position by manipulating the pivot tab. Still further, because the pivot tab is positioned so that it passes downwardly through the opening in the handle portion, there is sufficient clearance for a thumb of a user on the pivot tab as the pivot tab is pivoted downwardly. More specifically, because of the orientation of the pivot tab and the opening in the handle portion the cover portion can be pivoted to an open position by passing the pivot tab downwardly through the opening, and the thumb of a user does not interfere with the cover portion as it is moved to an open position.

Accordingly, it is a primary object of the instant invention to provide a container assembly which can be effectively utilized for storing, cooking and serving foods.

Another object of the instant invention is to provide a container assembly for foods comprising hingeably connected container and cover portions, a handle element on the container portion, and a pivot tab on the cover portion which is movable downwardly through an opening in the handle portion for pivoting the cover portion to an open position.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
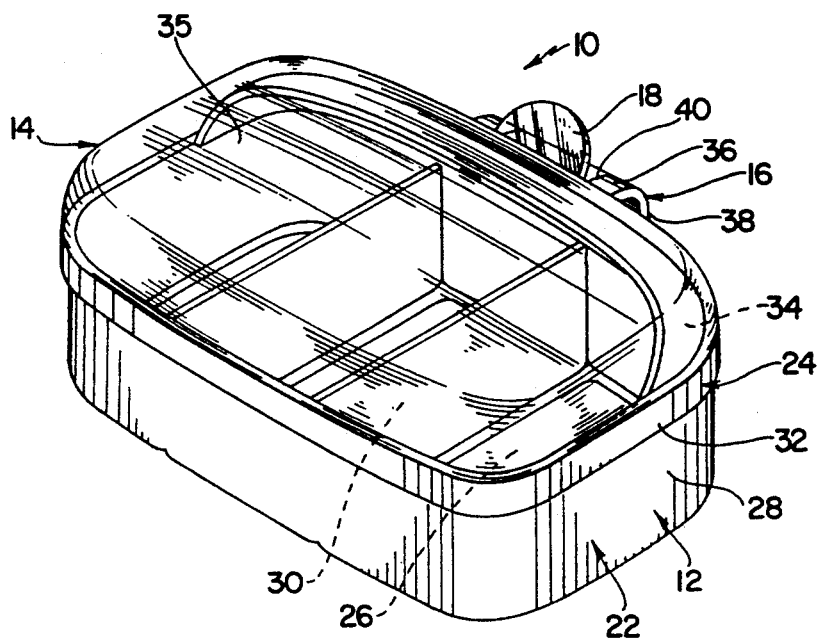
FIG. 1 is a front perspective view of the container assembly of the instant invention, with the cover portion in a closed position.
Figure 2:
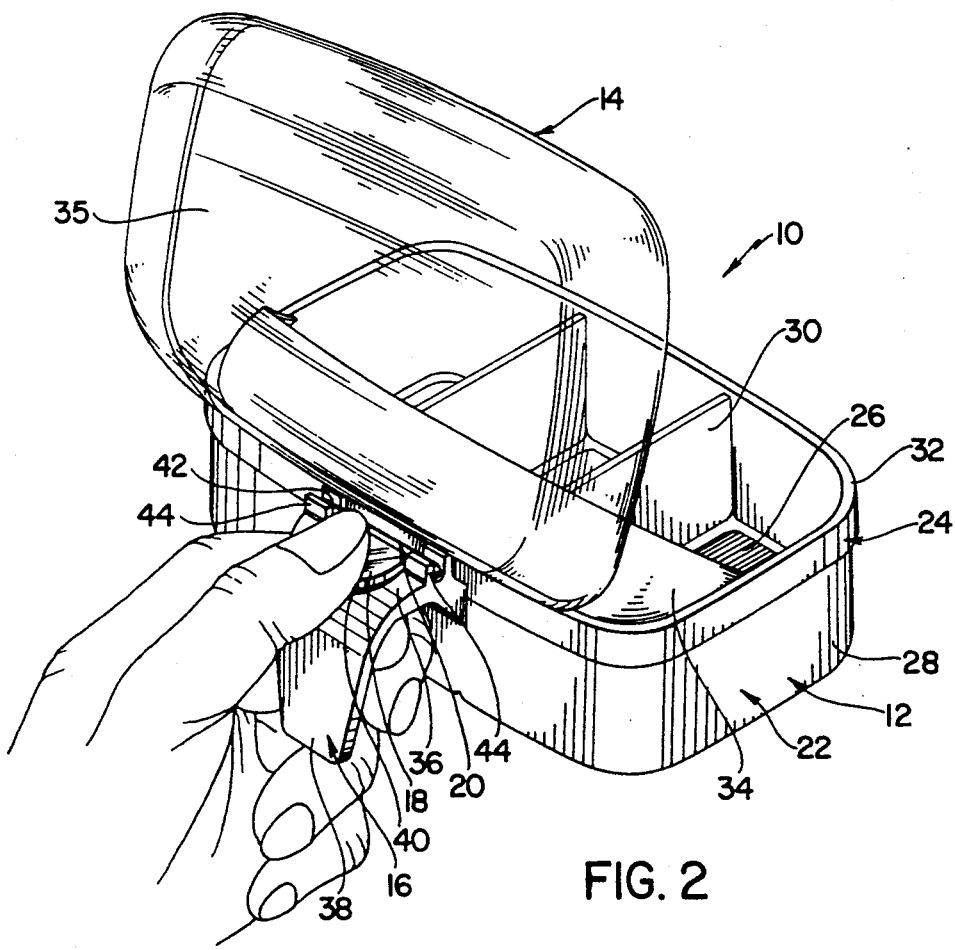
FIG. 2 is a rear perspective view thereof with the cover portion in an open position.

Referring now to the drawings, the container assembly of the instant invention is illustrated in FIGS. 1-4 and generally indicated at 10. The container assembly 10 includes a container portion generally indicated at 12, a cover portion generally indicated at 14, a handle portion generally indicated at 16, a pivot tab 18, and a hinge assembly generally indicated at 20. The container assembly 10 is adapted for use in storing and serving foods as well as for cooking foods in a microwave oven. Further, the container assembly 10 is adapted so that the cover portion 14 thereof can be pivoted to the open position illustrated in FIGS. 2 and 4; and the handle portion 16, the pivot tab 18 and the hinge assembly 20 are adapted to permit a user to hold the container assembly 10 in one hand while pivoting the cover portion 14 to an open position utilizing a thumb on the same hand as illustrated in FIG. 2.

The container portion 12 preferably comprises a lower portion generally indicated at 22 and an upper rim portion generally indicated at 24. The lower portion 22 is preferably integrally molded from a suitable plastic material and it includes a bottom wall 26, an upstanding sidewall 28 and a plurality of interior partitions 30. The rim portion 24 is received on the lower portion 22, and it includes a rim element 32 and a scraping hood section 34 which extends upwardly slightly from the rim element 32 and over the rearmost portion of the lower portion 22. The rim element 32 defines an upper edge of the container portion 12, and the scraping hood section 34 provides a convenient edge for scraping excess food from a spoon or the like when serving foods from the container portion 12. The rim portion 24 is preferably also integrally molded from a suitable plastic material, and it is preferably snap received in engagement on the lower portion 22 so that the rim portion 24 can be removed for cleaning.

Figure 3:
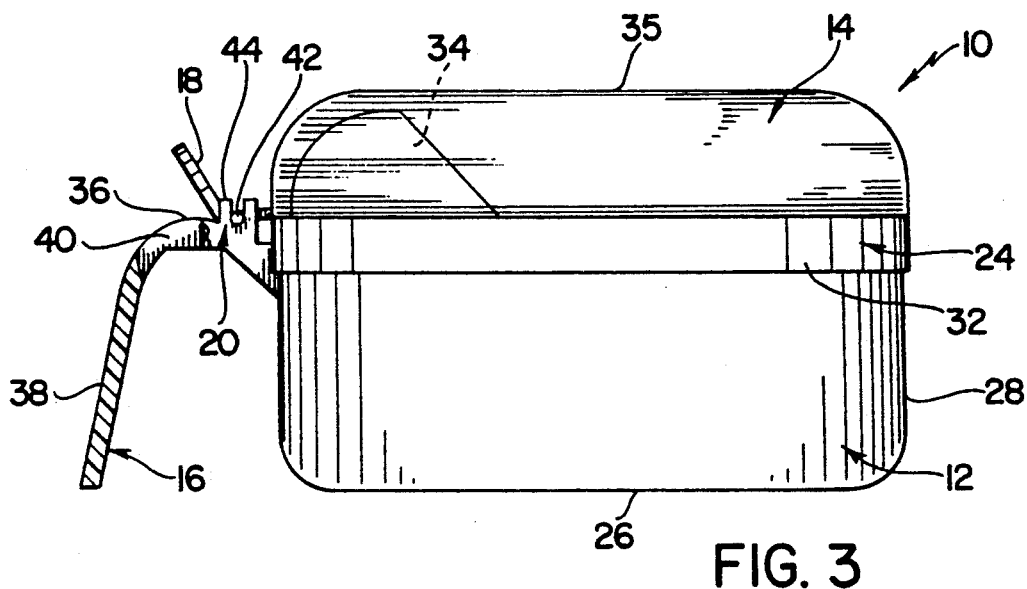
FIG. 3 is a side elevational view of the container assembly with the cover portion in a closed position and the handle portion illustrated partially in cross section.
Figure 4:
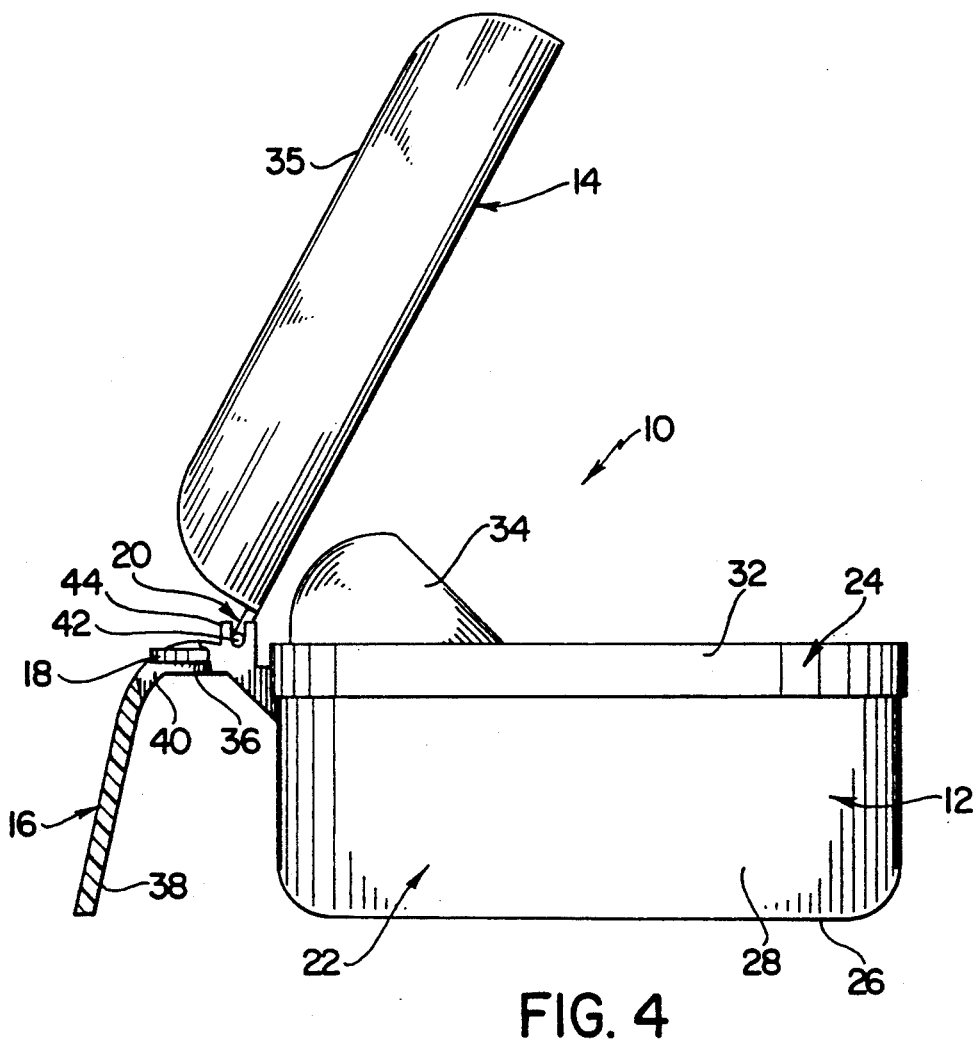
FIG. 4 is a side elevational view thereof with the cover portion in an open position and the handle portion illustrated partially in cross section.

The cover portion 14 is preferably integrally molded from a suitable transparent plastic material, and it is hingeably attached to the container portion 12 with the hinge assembly 20, as will hereinafter be more fully set forth. The cover portion 14 is formed in a generally dome-like configuration, and it includes a top wall 35. The cover portion 14 is adapted to be received in engagement with the rim element 32 so that the cover portion 14 covers the interior of the container portion 12 as illustrated in FIGS. 1 and 3.

The handle element 16 is preferably integrally molded with the lower portion 22 of the container portion 12, and it includes an outwardly extending first portion 36 which extends outwardly from the lower portion 22 of the container portion 12 adjacent the upper edge of the rim element 32, and a downwardly extending second portion 38 which extends downwardly from the first portion 36 in outwardly spaced relation to the sidewall 28 on the rear portion of the container portion 12. Formed in the upper first portion 36 of the handle element 16 is an opening 40 which extends inwardly to the hinge assembly 20. The opening 40 is formed in a generally arcuate configuration, and it is dimensioned for receiving the pivot tab 18 therethrough as will hereinafter be more fully set forth.

The pivot tab 18 is preferably integrally formed with the cover portion 14 from a suitable plastic material. The pivot tab 18 is dimensioned so that it is receivable through the opening 40, and it is attached to the cover portion 14 so that the pivot tab 18 extends angularly upwardly and rearwardly slightly when the cover portion 14 is in a closed position. In this connection, the pivot tab 18 is preferably disposed at an angle of between approximately 90° and 180° with respect to the bottom wall 26 of the container portion 14 when the cover portion 16 is in the closed position thereof, so that the pivot tab 18 can be effectively utilized for pivoting the top wall 35 to an open position. In this regard, by positioning the pivot tab 18 so that it is located at an angle of greater than 90° to the bottom wall 26 when the cover portion is in the closed position thereof, the pivot tab 18 can be more easily pulled rearwardly by the thumb of a user while the user is grasping the handle element 16. Further, by positioning the pivot tab 18 so that it angles rearwardly away from the cover portion 14 at an angle of less than 180° to the bottom wall 26 when the cover portion is in the closed position thereof, the pivot tab 18 can be more effectively and easily passed through the opening 40 as the cover portion 14 is pivoted upwardly. Still further, because of the orientation of the pivot tab 18, the thumb of a user normally does not obstruct the rearward pivotal movement of the cover portion 14 as the pivot tab 18 is pivoted rearwardly and downwardly.

The hinge assembly 20 comprises a hinge shaft 42 which is integrally formed with the pivot tab 18. The hinge assembly 20 further comprises two spaced pairs of mounting elements 44 which are adapted for snap receiving the hinge shaft 42 therein in order to pivotally mount the hinge shaft 42, so that it is rotatable about a pivot axis for pivoting the pivot tab 18 and the cover portion 14 as the cover portion 14 is moved between the open and closed positions thereof.

Accordingly, for use and operation of the container assembly 10, the cover portion 14 is pivoted to the open position thereof illustrated in FIG. 2 by grasping the handle element 16 in a hand of a user and depressing the pivot tab 18 with the thumb of the same hand to pivot the pivot tab 18 rearwardly and downwardly about the axis of the pivot shaft 42 and to thereby pivot the cover portion 14 upwardly. The compartments in the interior of the container portion 12 as defined by the partitions 30 can then be filled with appropriate foods, and the cover portion 14 can then be pivoted to a closed position by allowing the pivot tab 18 to pivot upwardly. The container assembly 10 can then be placed in a microwave oven in order to heat the food in the container portion 12, and thereafter the container assembly 10 can be removed from the oven and utilized for serving food from the container portion 12. In this connection, in order to serve food from the container portion 12, the handle portion 16 is once again grasped in the hand of a user, and the pivot tab 18 is depressed so that it passes through the opening 40 to pivot the cover portion 14 to the open position thereof. Thereafter, food can be dispensed from the compartments in the interior of the container portion 12, and excess food can be scraped from a spoon or other utensil utilizing the scraper dome portion 34.

It is seen therefore that the instant invention provides an effective container assembly for containing and serving various foods. The pivot tab 18 on the cover portion 14 is adapted to so it can pass through the opening 40 in the handle portion 16 as the cover portion 14 is pivoted to an open position to enable a user to hold the container assembly 10 with the handle portion 16 while manipulating the pivot tab 18 to pivot the cover portion to an open position. As a result, a user can hold and operate the container assembly 10 in one hand while serving food from the container portion 12 utilizing a utensil held in the user's other hand. Hence, it is seen that the container assembly of the instant invention represents a significant advancement int he art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A container assembly for foods comprising:
   (a) a container portion including a bottom wall and an upstanding sidewall which defines an upper edge of said container portion;
   (b) a cover portion hingeably attached to said container portion along a hinge axis located adjacent said upper edge, said cover portion including a top wall and being receivable in a closed position, wherein the latter is received in covering relation on said container portion, and wherein said top wall is substantially parallel to said bottom wall, said cover portion being pivotable to an open position wherein said cover portion is substantially completely removed from above said container portion;
   (c) a handle element extending outwardly from said sidewall of said container portion adjacent said hinge axis, said handle element having an opening therein; and
   (d) a pivot tab on said cover portion, said pivot tab extending outwardly from said cover portion above said handle element when said cover portion is in the closed position thereof and being oriented so that said pivot tab is manipulatable by a thumb on a hand of a user for moving said cover portion to the open position thereof when the hand is grasping said handle element, and so that said pivot tab is manipulatable by the thumb on the hand of the user to cause said pivot tab to pass completely through said opening in said handle element without causing the thumb to interfere with the movement of said over portion when said cover portion is pivoted to said open position, said pivot tab extending outwardly from said hinge axis at an outwardly extending angle of between approximately 90° and 180° relative to said bottom wall when said cover portion is in the closed position thereof and extending at least slightly angularly upwardly and outwardly relative to said cover portion when said cover portion is in the closed position thereof and said container assembly is in an upright disposition.

2. In the container assembly of claim 1, said handle element including a first portion which extends outwardly from said sidewall of said container portion and a second portion which extends downwardly from said first portion in outwardly spaced relation to said sidewall of said container portion, said opening being disposed in said first portion.

3. The container assembly of claim 1 further comprising a hinge shaft extending along said hinge axis, said hinge shaft being attached to said pivot tab so that said pivot tab extends outwardly from said hinge axis and means for rotatably attaching said hinge shaft to said container portion.

4. In the container assembly of claim 3, said means for rotatably attaching said hinge shaft to said container portion being operative for releasably rotatably attaching said hinge shaft to said container portion.

5. In the container assembly of claim 3, said means for rotatably attaching said hinge shaft to said container portion being located on said handle element and being operative for attaching said hinge shaft to said container portion with said handle element.

6. In the container assembly of claim 1, said opening extending outwardly substantially from said hinge axis.

* * * * *